Oct. 3, 1933.  C. W. MORTON ET AL  1,928,906
CLAMPING DEVICE
Filed Oct. 28, 1929
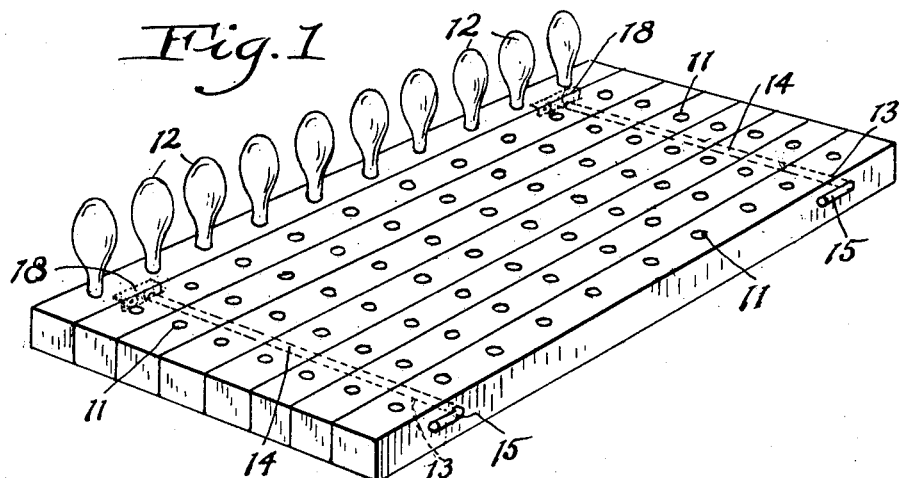
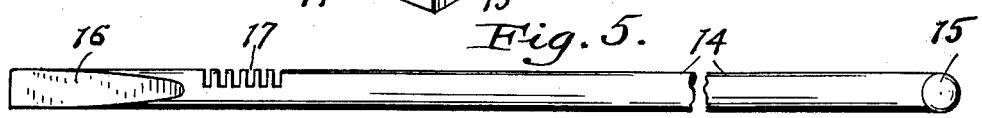
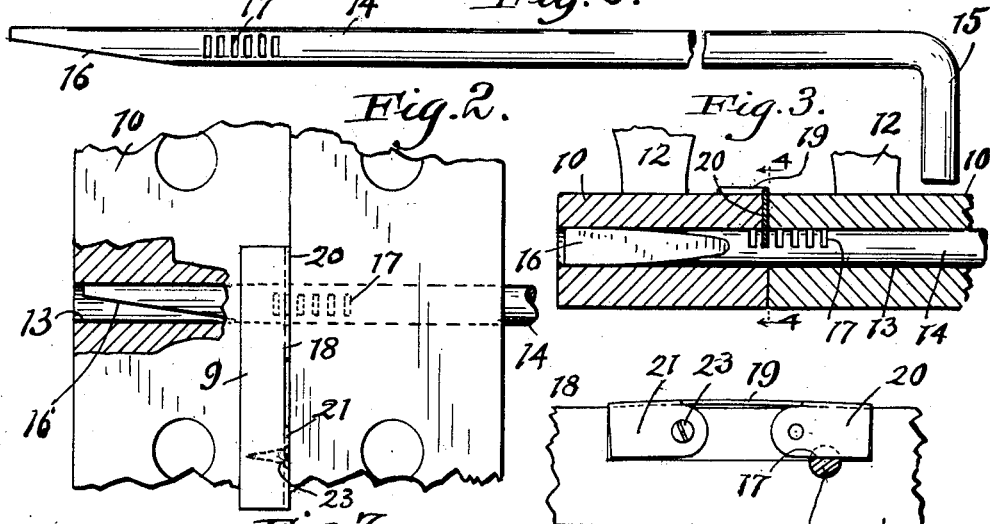
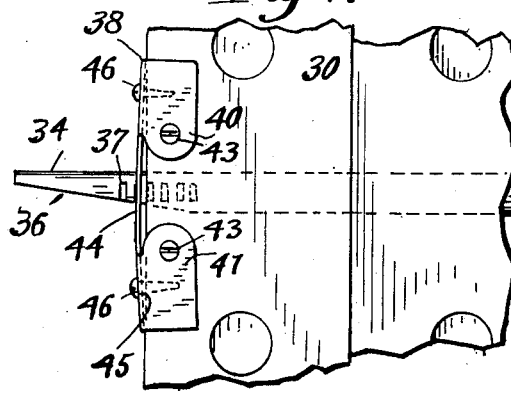
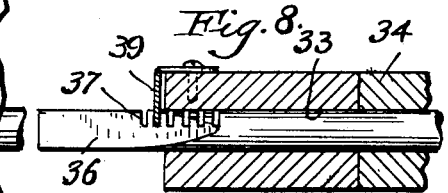

Patented Oct. 3, 1933

1,928,906

UNITED STATES PATENT OFFICE 1,928,906

CLAMPING DEVICE

Clifford W. Morton and Randolph J. Dorn, Sandusky, Ohio, assignors to The Barr Rubber Products Company, Sandusky, Ohio, a corporation of Ohio Application October 28, 1929. Serial No. 403,090

7 Claims. (Cl. 211—1)

This invention relates to a clamping device and is particularly adapted for the purpose of maintaining in assembled relation a plurality of members.

An object of the invention is to provide a device for holding together a plurality of members and maintaining the same in assembled relation by latching means, the operation of the latter permitting ready and efficient assembling and disassembling of the members.

Another object of the invention is to provide a device which is simple in construction, efficient in operation and inexpensive to manufacture.

With the objects above indicated and other objects hereinafter explained in view, our invention consists in the construction and combination of elements hereinafter described and claimed.

Referring to the drawing,

Fig. 1 is a perspective view of the members maintained in assembled relation by the device embodying the present invention.

Fig. 2 is a fragmentary top plan view of one of the latching members.

Fig. 3 is a fragmentary elevational view in section of that shown in Fig. 2.

Fig. 4 is a fragmentary end view taken on line 4—4 of Fig. 3.

Fig. 5 is a longitudinal view of the latching bar.

Fig. 6 is a longitudinal view of the latching bar in a plane at right angles to that shown in Fig. 5.

Fig. 7 is a fragmentary top plan view of a modified form of the invention.

Fig. 8 is a fragmentary elevational view in section of that shown in Fig. 7.

The device herein illustrated is designed for use in connection with the art of manufacturing rubber balloons and like articles, and it is to be understood that the invention is not limited thereto, inasmuch as the adaptability of the invention to other uses will be readily apparent from the following description of the invention.

Heretofore supporting members such as slats or bars were positioned in assembled relation, similar to that shown in Fig. 1, and were provided with transversely extending aligned openings through which bolts extended and nuts were applied to the screw-threaded ends of the bolts to maintain the slats or bars in assembled relation. This procedure, however, was slow in effecting the assembling and disassembling of the slats or bars and the present invention relates to a means whereby this objection is overcome in an efficient and expedient manner.

In the drawing a plurality of slats or bars 10, which may be of wood or other suitable material, are provided in their upper surfaces with a plurality of holes 11 which are spaced the desired distances apart longitudinally thereof for the purpose of supporting forms 12 which, in the present instance, are wooden, egg-shaped forms for forming rubber balloons. A particular advantage in connection with the forming of rubber balloons resides in the fact that a great many balloons may be formed by a single dipping operation when assembled as herein illustrated and subsequently readily disassembled, thus permitting a plurality of the balloons arranged in longitudinal alignment upon a single slat or bar 10 to be further operated upon.

The slats or bars 10 are provided with transverse openings 13 preferably located adjacent the ends thereof and extending in a plane at right angles with respect to the axis of the holes 11. These transverse openings 13 are arranged so as to align transversely and are adapted to receive an aligning rod 14, such as is shown in Figs. 5 and 6. One end of the rod 14 is bent laterally to form a suitable handle 15 by means of which the rod 14 may be rotated, for a purpose to be later described. The opposite end of the rod 14 is tapered at 16 in a plane substantially transversely with respect to the handle 15 and extends from the upper surface of the rod 14 towards the end of the rod to a point slightly below the longitudinal axis thereof. Adjacent the tapered portion 16 is a plurality of transversely extending slots 17 which are formed in the rod 14 in a plane transversely with respect to the tapered end 16, for a purpose to be later described.

Spring clips or latches 18 are attached to the outer slat or bar 10, as shown in Fig. 1, and inasmuch as the clips or latches 18 are identical in construction and function a description of the structural features of one will suffice.

The clip or latch 18 is preferably of resilient material and comprises a top portion 19 and a pair of laterally extending portions 20 and 21, preferably formed integral with the ends of the top portion 19. The portion 21 is provided with a transverse opening 22 which receives therein a screw 23 for securely attaching the portion 20 to the upright surface of the end bar 10 with the portion 20 being disposed over the upper half of the opening 13, as shown in Fig. 4.

The top portion 19 engages the upper surface of the bar 10 to which it is attached to thereby normally maintain the depending portion 19 in proper relation with respect to the opening 13, as heretofore stated, and has a central bowed portion to give resiliency thereto.

The clip or latch 18 being of resilient material is readily movable about the screw 23 to thereby expose the upper half of the opening 13 when subjected to upward pressure applied to the lower edge of the portion 20. The clips or latches 18, it will be noted, are attached to the inner upright surface of the end bar 10, as shown in Figs. 1, 2 and 3, and preferably, the depending portions 20 and 21 are countersunk to provide a substantially flush surface. Furthermore, the tapered end of the rod 14, when in its normal latching position, extends within the opening 13 of the outer bar 10 without projecting beyond, thereby permitting groups of latched bars 10 to be more readily assembled and more efficiently handled.

The portion 20 is adapted to cooperate with the transverse slots 17 on the rod 14 and in so doing maintains the bars 10 in assembled relation, the handle 15 cooperating with the end bar 10 opposide to one on which the clip or latch 18 is attached to provide a stop or abutment.

In operation, the bars 10 are suitably assembled, any number of which may be employed, and properly aligned by passing the rods 14 through the transverse opening 13. As the rods pass through, the tapers 16 on the ends of the rods are disposed in a substantially horizontal plane to thereby permit the tapered ends of the rods to pass beneath the lower edges of the portions 20. Upon further movement of the rods, the tapered surfaces 16 engage the lower edges of the portions 20 forcing them upwardly against the resiliency of the top portions 19 until the round of the rods pass beyond and the transverse slots 17 are adjacent the portions 20. The rods are then given quarter turns which bring the transverse slots 17 into engagement with the portions 20 and thereby latch the bars 10 in assembled relation.

To release the latching means, the rods 14 are given quarter turns in the reverse direction which move the slots 17 out of engagement with the portions 20 and the rods 14 may then be withdrawn and the bars 10 disassembled.

A modified showing of the latching means is illustrated in Figs. 7 and 8 and comprises a clip or latch 38 preferably of resilient metal which has a depending portion 39 and a pair of laterally extending attaching portions 40 and 41, spaced apart so as to provide a centrally disposed resilient portion 44 in the depending portion 39. The attaching portions 40 and 41 are provided with openings 42 through which extend screws 43 for the purpose of attaching the clip or latch to the upper surface of the end slat or bar 30. In attaching the clip or latch 38, the ends thereof are moved inwardly slightly so as to bulge the resilient portion 44 outwardly and while in this position, the screws 43 are turned into place. The depending portion 39 of the clip or latch 38 is also provided with openings 45 near its outer ends which are adapted to receive screws 46 for securely maintaining the depending portion 39 in engagement with the side of the slat or bar 30. The clips or latches 38 are located so that the resilient portions 44 thereof are disposed adjacent to and overlap the upper portions of the transverse openings 33 in the outer slat or bar 30.

In this modified form, the transverse slots 37 are positioned in a plane at substantially right angles to the plane of the tapered surface 36, the slots extending through portions of the tapered surface.

It will be noted in this modification that the clip or latch 38 is attached to the outer portion of the end bar 10 with the depending portion 39 extending substantially parallel with the rear upright surface of the bar. When it is desired to move the rod 34 to latching position, the tapered end 36 is presented in substantially a horizontal plane so that the end may freely pass under the lower edge of the depending portion 39. Upon further movement of the rod 34, a tapered surface engages the lower edge of the depending portion 39 and the rod should then be given a quarter turn which brings the transverse openings 37 into cooperative engagement with the depending portion 39, thereby latching the bars 30 in assembled relation. It will be noted that due to the resiliency of the bulged portion 44, there is a tendency to draw the bars 30 into closer relation, this being due to the fact that the handle portion provides an abument for the bar at the opposite end.

To release the latching means, the rod 34 is given a quarter turn in the reverse direction which moves the slots 37 out of engagement with the depending portion 39 and the rod may then be removed and the bars disassembled.

While we have described a preferred embodiment of the invention, it is to be understood that we are not to be limited thereto inasmuch as changes and modifications may be resorted to without departing from the spirit of the invention as defined in the appended claims.

Having thus described our invention, what we claim is:

1. In a device of the character described, a plurality of supporting members arranged side by side in substantially the same plane and having aligned openings therethrough, an aligning member extending through said openings, and resilient means attached to one of said members and adapted to cooperate with said aligning member when in one position to thereby maintain said members in assembled relation.

2. In a device of the character described, a plurality of supporting members arranged side by side in substantially the same plane and having aligned openings therethrough in a plane at right angles to said supporting surfaces, an aligning member extending through said openings, and resilient means attached to one of said members and adapted to cooperate with said aligning member when in one position to thereby maintain said members in assembled relation and when in another position out of cooperation to thereby permit disassembling of said members.

3. In a device of the character described, a plurality of supporting members arranged side by side in substantially the same plane and having aligned openings therethrough, an aligning rod extending through said openings, and a resilient latch carried by one of the outer members and adapted to cooperate with said rod to maintain said members in assembled relation.

4. In a device of the character described, a plurality of supporting members arranged side by side in substantially the same plane and having aligned openings therethrough, an aligning rod extending through said openings, means on one end of said rod, and a latch carried by one of the outer members and adapted to cooperate with the means on said rod to thereby maintain said members in assembled relation.

5. In a device of the character described, a plurality of supporting members arranged side by side in substantially the same plane and having aligned openings therethrough, an aligning rod extending through said openings, transverse slots on one end of said rod, and a resilient latch carried by one of said members and adapted to cooperate with said slots to thereby maintain said members in assembled relation.

6. In a device of the character described, a plurality of supporting members arranged side by side in substantially the same plane and having aligned openings therethrough, an aligning rod extending through said openings, a handle portion at one end of said rod, transverse slots at the other end of said rod, a tapered end portion adjacent said slots, and a latching member attached to one of said members and adapted to cooperate with said slots to maintain said members in assembled relation when said rod is turned in one direction and moved out of cooperation when said rod is turned in the reverse direction to permit disassembling of said members.

7. A rod comprising a body portion, a laterally extending portion at one end thereof, a tapered portion at the opposite end, and transverse slots adjacent the tapered portion in a plane at an angle thereto.

CLIFFORD W. MORTON.
RANDOLPH J. DORN.